(12) United States Patent
Hilk

(10) Patent No.: US 6,481,735 B1
(45) Date of Patent: Nov. 19, 2002

(54) APPARATUS FOR CARRYING A LOAD BEHIND A BICYCLE

(75) Inventor: Lyle R. Hilk, Eureka, CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/574,964

(22) Filed: May 19, 2000

(51) Int. Cl.[7] ............................................. B62K 27/00
(52) U.S. Cl. ...................................... 280/204; 280/503
(58) Field of Search ................................ 280/204, 503, 280/78, 47.33

(56) References Cited

U.S. PATENT DOCUMENTS

| | | | |
|---|---|---|---|
| 3,347,559 A | | 10/1967 | Robinson |
| 3,567,249 A | * | 3/1971 | Robinson .................... 280/204 |
| 4,511,155 A | | 4/1985 | Galloway |
| 4,725,067 A | | 2/1988 | Lundy |
| 5,454,577 A | * | 10/1995 | Bell ........................... 280/204 |
| 5,516,131 A | | 5/1996 | Novotny |
| 5,785,333 A | * | 7/1998 | Hinkston et al. ............ 280/204 |
| 5,791,668 A | * | 8/1998 | Lenardson ................ 280/47.33 |
| 6,099,011 A | * | 8/2000 | Beaudoin et al. ........... 280/204 |
| 6,182,990 B1 | * | 2/2001 | Everett ....................... 280/204 |
| 6,203,033 B1 | * | 3/2001 | Knoll ....................... 280/47.33 |
| 6,270,092 B2 | * | 8/2001 | Darling, III .............. 280/47.33 |

OTHER PUBLICATIONS

Excerpts from Bob Trailers, Inc. website, printed Apr. 6, 2000.

* cited by examiner

Primary Examiner—Kevin Hurley
Assistant Examiner—Matt Luby
(74) Attorney, Agent, or Firm—Kolisch Hartwell, P.C.

(57) ABSTRACT

An apparatus for carrying a load behind a bicycle. The apparatus includes a carriage adapted to carry a load, and at least one wheel rotatably connected to the carriage. A hitch assembly is coupled to the carriage and includes at least one latch mechanism removably connectable to a bicycle to couple the carriage to the bicycle. The latch mechanism is adapted to removably connect to a skewer assembly receivable in the hub of a rear wheel of the bicycle.

22 Claims, 7 Drawing Sheets

APPARATUS FOR CARRYING A LOAD BEHIND A BICYCLE

FIELD OF THE INVENTION

The present invention relates generally to equipment for bicycles, and more particularly to a trailer for carrying a load behind a bicycle.

BACKGROUND

Bicyclists often need to carry loads when cycling. While it is possible for a rider to carry relatively small loads in a backpack or similar device, this may become uncomfortable over long periods. Furthermore, other arrangements must be made to carry large and/or heavy loads. One option is to carry the load in a basket attached to the bicycle. However, this may cause the operation or handling of the bicycle to change, especially if the load is relatively heavy and effects the balance of the bike.

An alternative solution involves placing the load in a separate vehicle that is coupled to the bicycle. For example, the load may be placed in a trailer that is towed behind the bicycle. However, prior designs of these trailers have been found to have awkward and/or undependable coupling mechanisms for connecting the trailer to the bicycle. In addition, prior designs lack a safe mechanism for loading the trailers when uncoupled from the bicycle. Further, many of the prior designs are unnecessarily complicated and expensive to manufacture.

SUMMARY

The present invention provides an apparatus for carrying a load behind a bicycle. The apparatus includes a carriage adapted to carry a load, and at least one wheel rotatably connected to the carriage. A hitch assembly is coupled to the carriage and includes at least one latch mechanism removably connectable to a bicycle to couple the carriage to the bicycle. The latch mechanism is adapted to removably connect to a skewer assembly receivable in the hub of a rear wheel of the bicycle.

DETAILED DESCRIPTION

Figure 1:
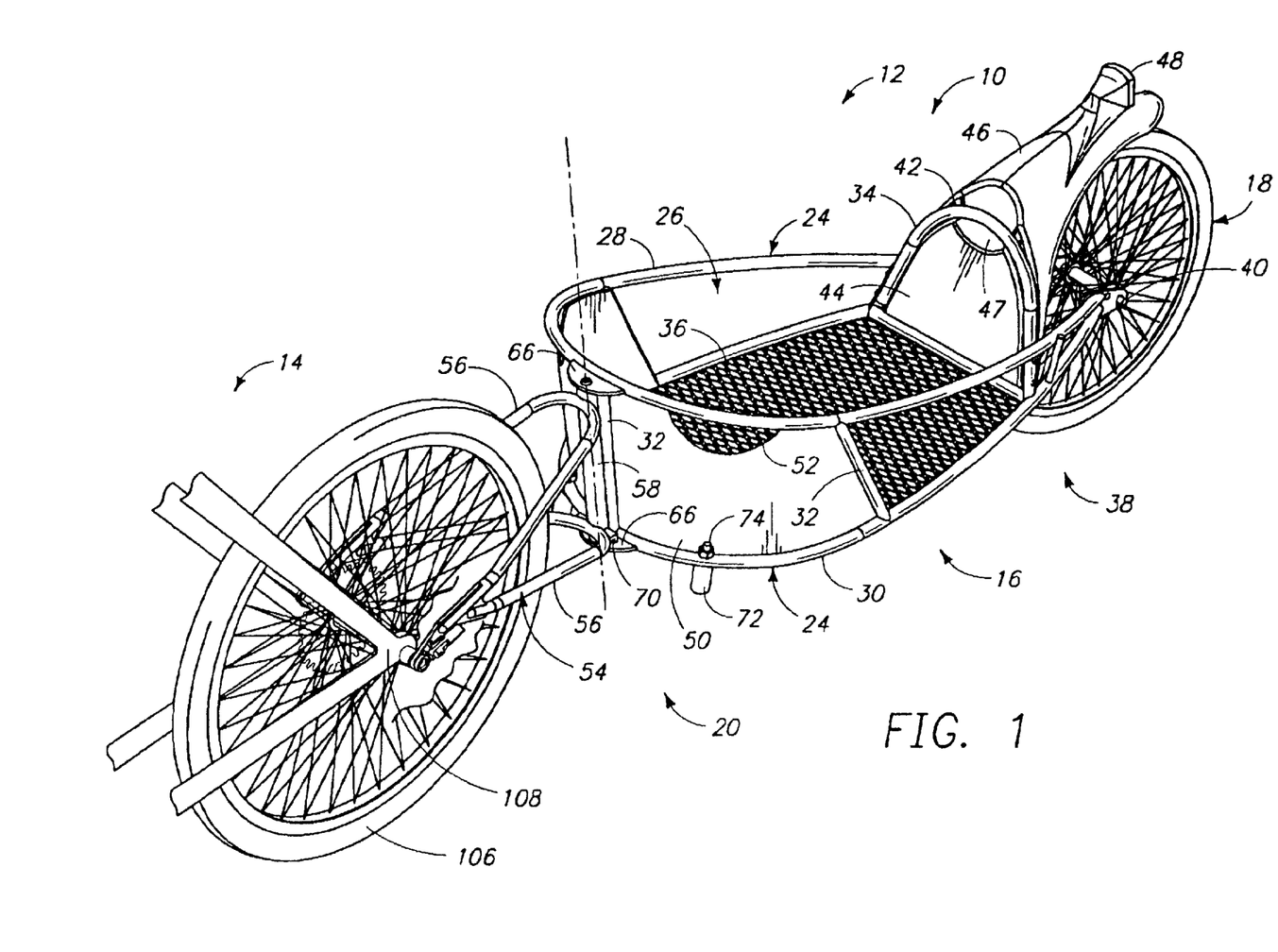
FIG. 1. is an isometric view of an apparatus for carrying a load behind a bicycle according to the present invention. The rear wheel and partial frame of a bicycle is also shown.
Figure 2:
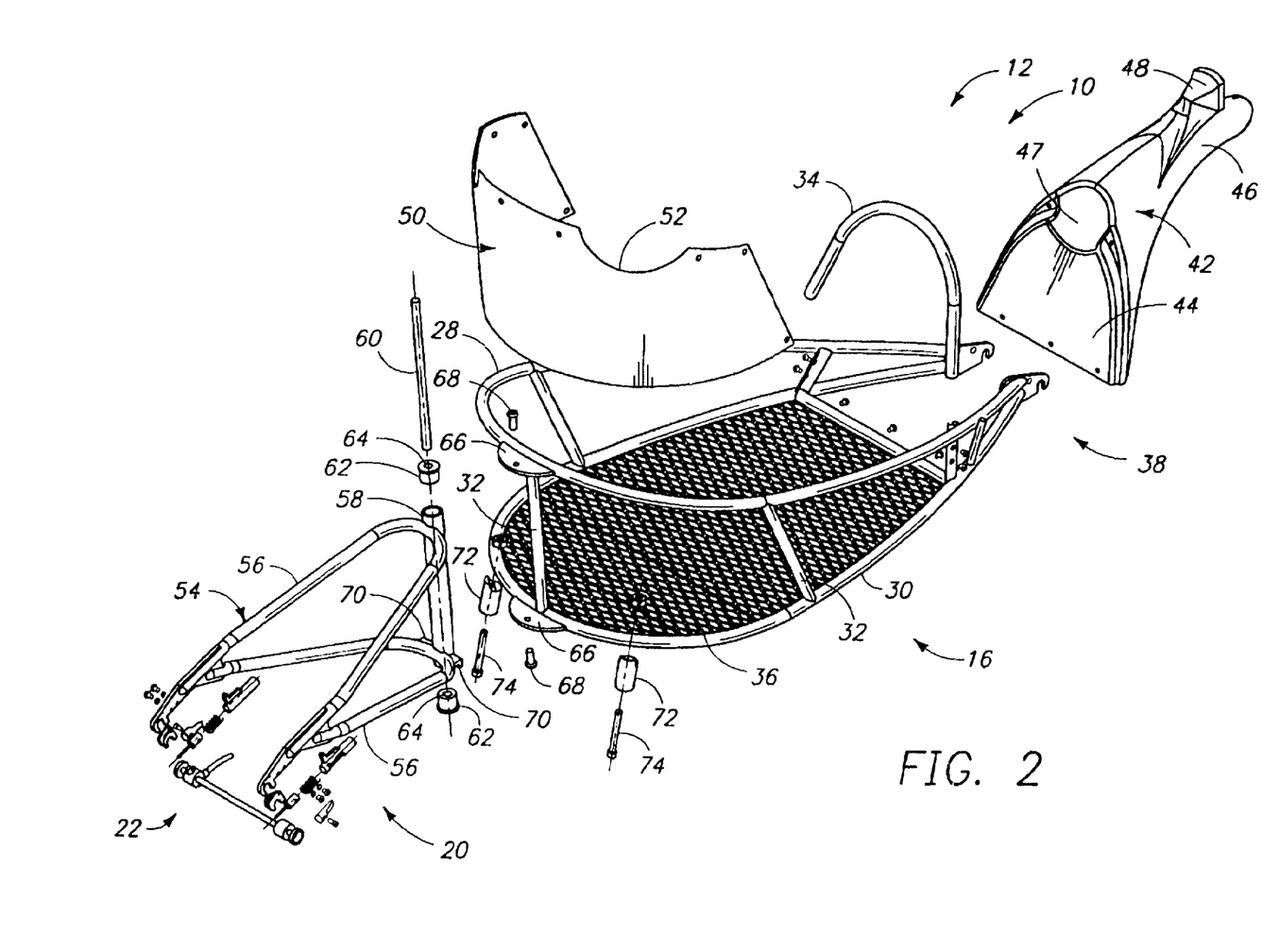
FIG. 2 is an exploded isometric view of a trailer and skewer assembly according to the present invention.

An apparatus for carrying a load behind a bicycle is indicated generally at 10 in FIGS. 1 and 2. Apparatus 10 includes a load-supporting trailer 12 that is removably connectable to a portion of a bicycle 14. Trailer 12 includes a carriage 16 adapted to support a load and one or more wheels 18 rotatably connected to the carriage. The trailer also includes a hitch assembly 20 coupled to the carriage. A skewer assembly 22 is connected to bicycle 14 and adapted to engage hitch assembly 20 to connect the trailer to the bicycle. Apparatus 10 allows a rider to carry a load easily and safely behind the bicycle.

It will be appreciated by those of skill in the art that bicycle 14 may be any type of bicycle including a mountain bike, road bike, tandem bike, recumbent bike, etc. As will be discussed in more detail below, skewer assembly 22 and trailer 12 are adapted for use with a variety of different styles of bikes having different size wheels.

In the exemplary embodiment depicted in FIGS. 1–4, trailer 12 is in the form of a cargo trailer adapted for carrying any inanimate loads such as equipment, packages, etc. Alternatively, trailer 12 may also be used to carry human or animal passengers.

In the exemplary embodiment, carriage 16 includes a tubular frame 24 which defines a load-carrying region 26. Frame 24 includes upper frame members 28 and lower frame members 30, which are connected by one or more side frame members 32. A rear frame member 34 connects opposite ends of both the upper and lower frame members. The upper and lower frame members are arcuate, forming a substantially teardrop-shaped load-carrying region 26. The frame members may be constructed from any suitable material including plastic, aluminum or steel tubing, and may be formed from continuous pieces or multiple sections. A perforated panel 36 extends across the area enclosed by lower frame member 30 to form a floor of the carriage. The perforations in floor panel 36 prevent rain, etc., from pooling in the bottom of the carriage. Alternatively, floor panel 36 may be constructed of a solid piece of material. In any event the floor is typically constructed of a substantially rigid material such as plastic or metal. The frame members and floor panel are joined by suitable attachment means such as screws, welding, snap-fit connectors, etc.

The adjacent ends of upper and lower frame members 28 and 30 intersect behind rear frame member 34 to form a rear fork assembly 38. Wheel 18 is rotatably coupled to rear fork assembly 38 to movably support the rear of carriage 16 above the ground. Wheel 18 may be a standard bicycle wheel or any other type of wheel configured to support the weight of carriage 16 and the loads expected to be carried in the carriage. In any event, wheel 18 typically includes a central hub through which an axle or skewer 40 extends. The skewer may be a traditional skewer or may be a quick-release skewer as is well known in the art. Fork assembly 38 is configured to engage the skewer to securely connect carriage 16 to wheel 18, while allowing the wheel to rotate freely about the skewer. Preferably, the size of wheel 18 should be sufficient to hold at least the rear portion of the carriage off the ground.

Load-carrying region 26 is at least partially defined by a rear wall member 42 attached to rear frame member 34. The rear wall member includes a lower portion 44 adjacent load-carrying region 26. Lower portion 44 extends between the sides of frame 24 to cover the area enclosed by rear frame member 34 and floor panel 36. The lower portion forms the rear wall of the load-carrying region, preventing items placed in the carriage from falling out of the carriage or coming into contact with-the wheel. Rear wall member 42 also includes an upper portion 46 that extends outward or rearward from load-carrying region 26 to form a fender over wheel 18. A recessed region 47 adjacent the top of rear frame member 34 provides clearance for a rider's hand and allows a rider to grip the rear frame member, thereby providing a handle for lifting and positioning the carriage.

Rear wall member 42 serves the dual purposes of containing cargo within the carriage and shielding the cargo from water or debris kicked up by the wheel. The rear wall member is typically formed of a relatively rigid material such as metal or plastic. A light and/or reflector 48 may be mounted on the rear wall member for safety. Rear wall member 42 also provides structural support to the carriage due to its attachment to rear frame member 34.

Figure 3:
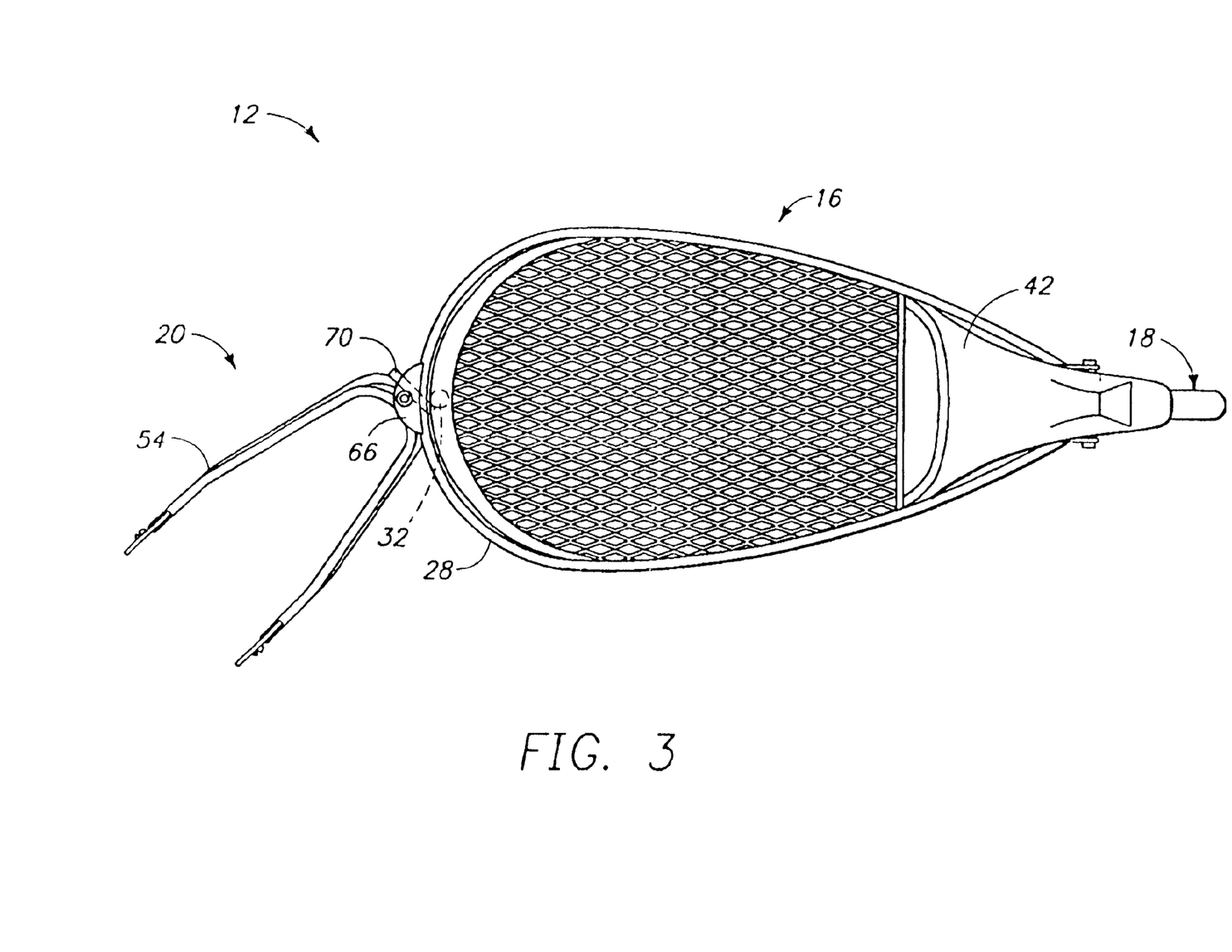
FIG. 3 is a top plan view of the trailer of FIG. 1. showing the pivotal connection of the hitch assembly to the carriage, and showing the shoulder regions on the yoke engaging the carriage frame to limit the pivot angle of the yoke relative to the carriage.

As can be seen in FIGS. 1–3, lower portion 44 is mounted forward of wheel 18 and rear fork assembly 38. The rear wall member narrows from the lower portion to the upper portion as it transitions from forming the rear wall of the load-carrying region to forming a fender for wheel 18. Thus, lower portion 44 is wider than the rear fork assembly so that the rear portion of the load-carrying region is not limited to the width of the rear fork assembly.

In the exemplary embodiment, a fairing member 50 extends between upper frame do member 28 and lower frame member 30, adjacent the front of carriage 16. The fairing member is attached to the frame member by suitable means such as screws, etc. Fairing member 50 serves to protect the load-carrying region from water and debris kicked up by the bicycle wheel, as well as to provide a more aerodynamic profile to the trailer. The fairing member may include one or more cut-out regions 52 adjacent a frame member to allow the frame to be gripped for lifting and connecting/disconnecting the trailer from bicycle 14. Alternatively, one or more handles may be mounted on the frame or fairing member for lifting the trailer. Fairing member 50 may be constructed of any suitable material including metal, plastic, fiberglass, fabric, rubber, netting, etc.

While the exemplary embodiment of carriage 16 has been described as having a tubular frame 24, it will be appreciated that other carriage structures may be used as well. For example, carriage 16 may be constructed from solid, planar members such as sheet metal, plastic, fiberglass, etc., within the scope of the invention. In addition, carriage 16 may also include a top or cover configured to contain and/or protect cargo carried by the trailer. Carriage 16 may also be formed in any desired shape and may include a plurality of wheels. In alternative embodiments, some or all of trailer 12 is collapsible for storage.

Hitch assembly 20 includes a yoke 54 pivotally coupled to the front portion of carriage 16. Yoke 54 includes upper and lower U-shaped, tubular frame members 56 which are joined, adjacent the central regions of the frame members, by an elongate sleeve 58. The frame members are joined to sleeve 58 by suitable means such as welding, screws, etc. As best seen in FIG. 2, sleeve 58 has a hollow bore adapted to receive an elongate spindle 60. A pair of cylindrical bushings 62 are receivable in either end of sleeve 58. Bushings 62 include central holes 64 adapted to receive spindle 60 so that the spindle is rotatably received within sleeve 58.

Carriage 16 includes a pair of brackets 66 disposed adjacent the front edges of upper frame member 28 and lower frame member 30. Sleeve 58 is sized to fit closely between brackets 66 when bushings 62 and spindle 60 are received in the sleeve. Each end of spindle 60 includes a hollow, threaded bore (not shown) adapted to receive a screw 68 which passes through the corresponding bracket 66. Thus, yoke 54 pivots about a generally vertical pivot axis defined by spindle 60, which is rigidly attached to the carriage. This allows the trailer to follow the bicycle during turns without causing the rear of the trailer to swing outward.

The lower frame member of yoke 54 includes one or more shoulder members 70 adjacent sleeve 58. As shown in FIG. 3, shoulder members 70 are configured to engage a portion of the carriage to limit the maximum pivot angle of the yoke relative to the carriage. In the exemplary embodiment, shoulder members 70 strike against a carriage side frame member 32 adjacent the front of the carriage when the yoke is pivoted too far relative to the carriage. The shoulder members prevent the yoke from pivoting so sharply as to strike against fairing member 50.

In some embodiments, apparatus 10 may include one or more support stands 72 connected to the trailer to support the trailer above the ground when it is not connected to bicycle 14. Preferably, support stands 72 are rigidly attached to the trailer to ensure the stands remain stable during loading and unloading. In contrast, prior stands which are pivotally attached to a trailer may accidentally pivot out of position during loading, potentially causing damage to the trailer and/or injury to the rider. As best seen in FIG. 2, the exemplary embodiment includes a pair of laterally spaced stands 72 rigidly attached to the bottom of the carriage by bolts 74. The lateral spacing provides a stable support for embodiments in which the trailer includes a single centrally-located wheel. Alternatively, the stands may be attached to other portions of the carriage, such as hitch assembly 20.

Figure 4:
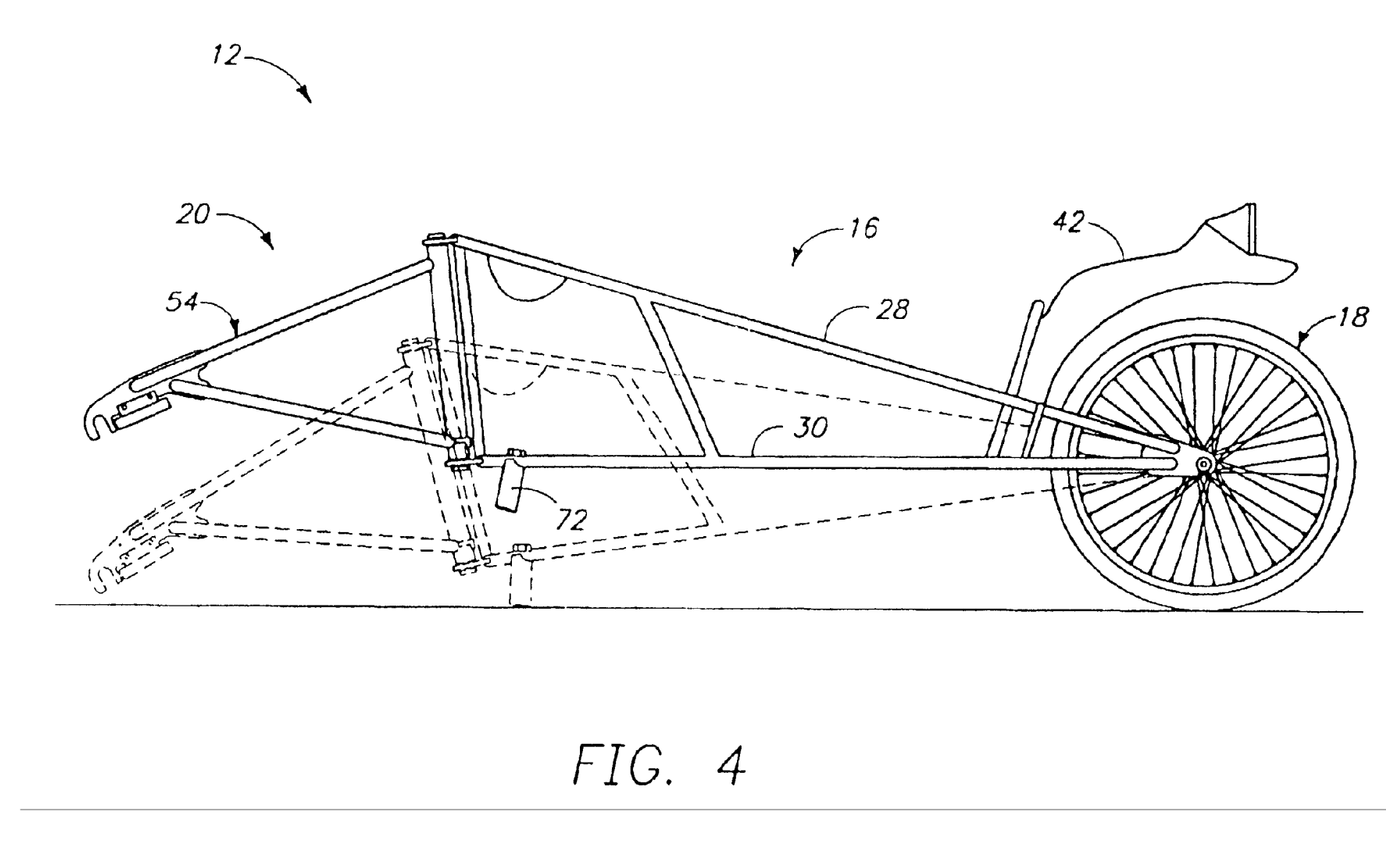
FIG. 4 is a side elevation of the trailer of FIG. 1, showing, in dashed lines, the trailer disconnected from the bicycle and supported off the ground by the trailer wheel and support stands.

As shown in FIG. 4, support stands 72 are sized not to contact the ground when the bottom surface of the carriage is in a generally horizontal orientation (i.e., connected to the bicycle). However, support stands 72 are sized to extend below the carriage to support the carriage off the ground when the trailer is not connected to the bicycle. In the exemplary embodiment, support stands 72 are also sized to support hitch assembly 20 off the ground when the trailer is not connected to the bicycle. This allows the trailer to be loaded while not connected to the bicycle (or to be disconnected while loaded), without causing stress on the hitch assembly.

Figure 5:
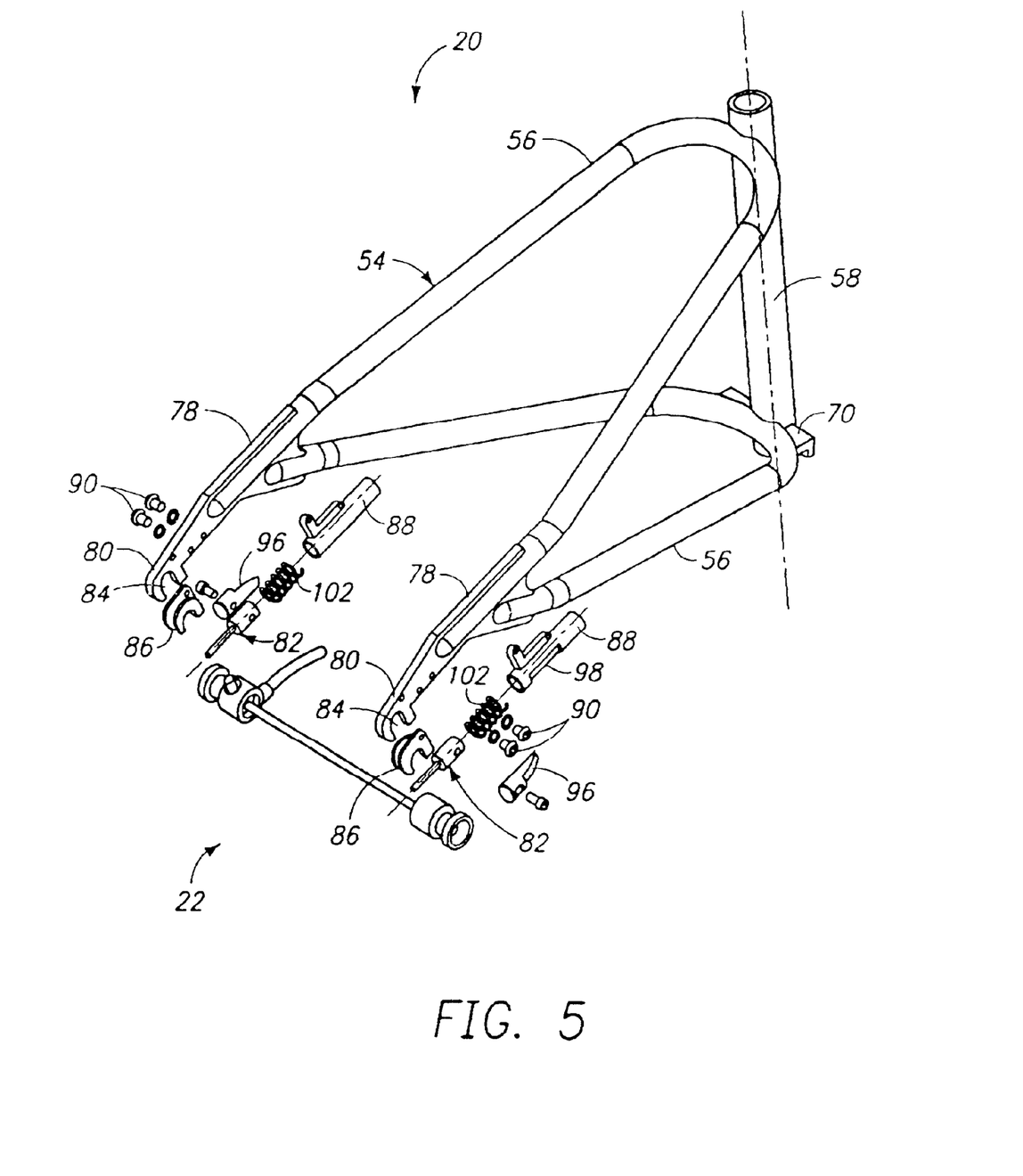
FIG. 5 is a magnified exploded isometric view of the latch mechanism of FIG. 1.
Figure 6:
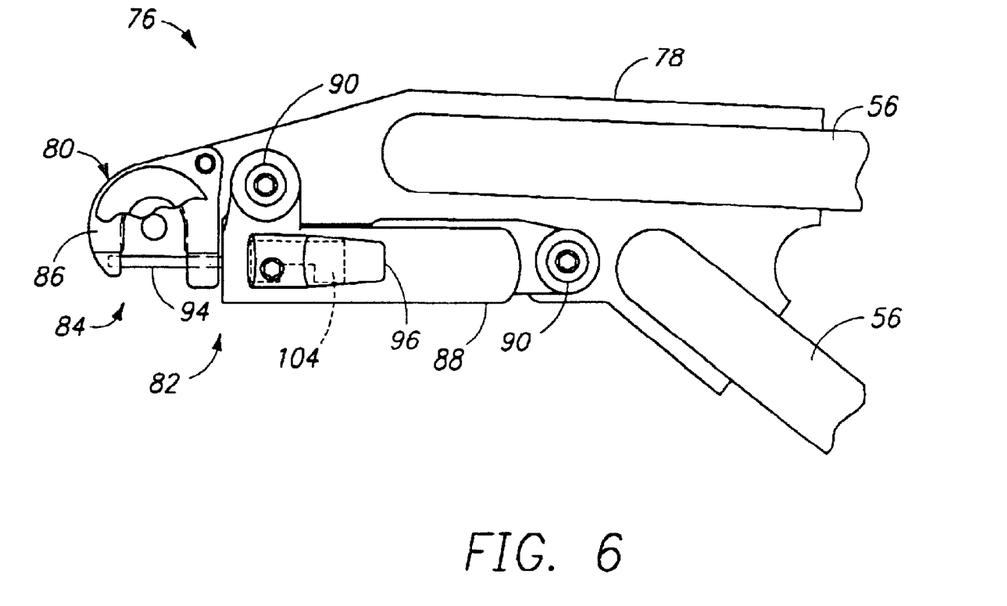
FIG. 6 is a close-up side elevation showing the latch mechanism in the closed position to prevent the yoke from being disconnected from (or connected to) the skewer assembly.
Figure 7:
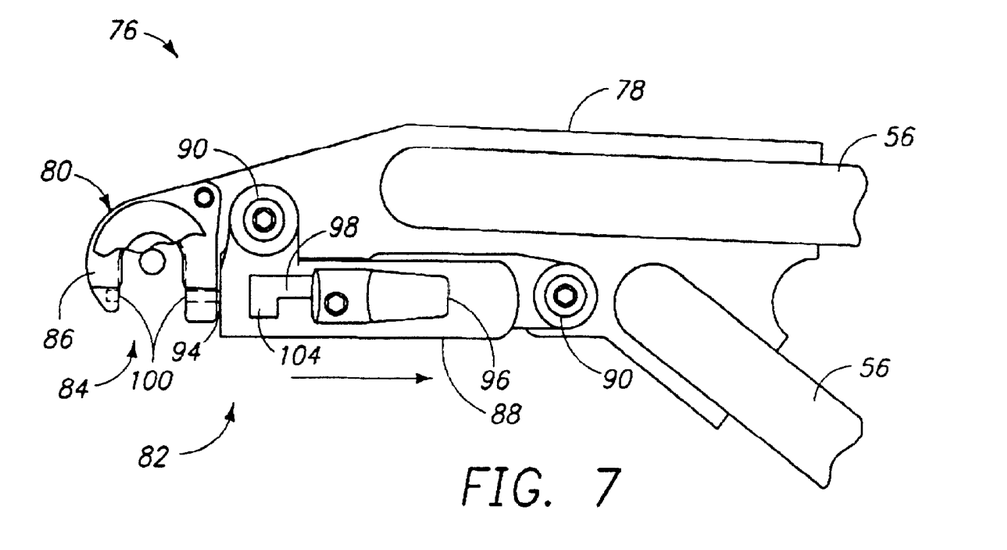
FIG. 7 is a close-up side elevation showing the latch mechanism in the open position to allow the yoke to be disconnected from (or connected to) the skewer assembly.

As best seen in FIGS. 5–7, hitch assembly 20 includes one or more latch mechanisms 76 removably connectable to skewer assembly 22. In the exemplary embodiment, the ends of upper and lower frame members 56 converge forward of the carriage to form a pair of spaced-apart mounting arms 78. A latch mechanism is disposed on each mounting arm 78 to engage opposite ends of the skewer assembly.

Each latch assembly includes a receiver member 80 adapted to receive and fit over a portion of the skewer assembly, and a locking member 82 adapted to retain the skewer to assembly within the receiver member. Receiver 80 defines a U-shaped opening 84 adapted to slip over the skewer assembly so that the weight of the front portion of trailer 12 is supported by the skewer assembly. In the exemplary embodiment, a U-shaped bushing 86 is disposed in opening 84 between the receiver member and the skewer assembly, and is pivotal about the skewer assembly. Bushing 86 is attached to receiver member 80 by suitable means such as a screw passing through matching holes on the bushing and receiver member. When the receiver member and bushing are placed on the hitch assembly, the yoke is coupled to the bicycle and pivotal about the elongate axis of the skewer assembly. The bushing is typically constructed of a material suitable for rotational contact such as nylon, etc.

Each latch mechanism 76 also includes a generally cylindrical housing 88 mounted on the corresponding receiver member by one or more screws 90. Locking member 82 includes a cylindrical piston 92 concentrically aligned with a locking pin 94. Locking member 82 is slidably received in the hollow bore of housing 88 with pin 94 oriented toward the forward end of the housing. Piston 92 is sized to fit and slide smoothly within the central bore of the housing. A gripping member 96 protrudes through a slot 98 in housing 88 and is connected to piston 92.

When gripping member 96 is adjacent the front end of slot 98, locking pin 94 protrudes from the front end of housing 88. The housing is aligned with holes 100 in receiver member 80 so that pin 94 passes through the holes. As a result, pin 94 blocks opening 84 and prevents the skewer assembly from being removed from the receiver member. Thus, locking member 82 is in a closed position and latches the yoke to the skewer assembly. Conversely, when gripping member 96 is adjacent the rear end of slot 98, locking pin 94 is withdrawn from holes 100 and does not block opening 84. Thus, locking member 82 is in an open position which allows the skewer assembly to be removed from the receiver member.

Locking member 82 may be biased in either the open or closed position by a biasing element, as desired for a particular application. Typically, the biasing element is configured to bias the locking member toward the closed position. In the exemplary embodiment, the biasing element is a compression spring 102 disposed in housing 88 between piston 92 and the end wall of the housing. Spring 102 biases the piston toward the front end of the housing, thereby maintaining the locking member in the closed position. A rider attaches the trailer to the bike by sliding each gripping member backward until the locking member is in the open position, placing the receiver members over the skewer assembly, and then releasing the gripping members. The locking members then return to the closed position, latching the trailer to the bicycle. The trailer is disconnected from the bicycle by reversing the above process.

In one alternative embodiment, locking member 82 is lockable in the open and/or closed position. As shown in FIGS. 6 and 7, slot 98 is generally U-Shaped, having notches 104 at the forward and rearward ends of the slot, which are sized to receive gripping member 96. When locking member 82 is in the open position, gripping member 96 is rotatable into the rearward notch, to lock the locking member in the open position. Similarly, when locking member 82 is in the closed position, gripping member 96 is rotatable into the forward notch, to lock the locking member in the closed position. The gripping member is held in the notches by frictional contact with the sides of the notches. Thus, to move the locking member between the open and closed positions, the gripping member is first rotated out of the corresponding notch, and then pulled rearward or released, as necessary. Alternatively, the gripping member may be urged into notches 104 by a biasing member.

One advantage of the latch mechanism described above is that the locking member is relatively permanently coupled (i.e., by screws through the housing) to the yoke. In other words, although locking member 82 is selectively movable relative to the receiver member, the locking member is nevertheless rigidly secured to the yoke in any direction other than along the elongate axis off the housing. Thus, the locking member is not subject to being lost or damaged as is the case with prior latch mechanisms with removable locking pins.

While one particular latch mechanism has been described above, it will be appreciated that many variations may be made within the scope of the invention. For example, receiver member 80 and bushing 86 may be oriented differently or have a different shape. As another example, latch mechanism 76 may be configured with a different biasing mechanism. Alternatively, locking member 82 may be movable between the open and closed position in a different way, such as pivotally, etc.

As described above, trailer 12 includes hitch assembly 20 which is adapted to receive skewer assembly 22 and connect the trailer to bicycle 14. Skewer assembly 22 may be a standard skewer assembly, or may be a quick release skewer assembly as depicted in the exemplary embodiment. As shown in FIG. 1, bicycle 14 includes a rear wheel 106 having a central hub 108. Skewer assembly 22 is receivable in hub 108 to connect the frame of the bicycle to wheel 106.

Skewer assembly 22 includes an elongate skewer 110 configured to extend through hub 108. Opposite ends of the skewer engage portions of the bicycle frame as is well known in the art. A cam housing 112 adapted to fit on the skewer is disposed at one end of the skewer. A cam member 114 is received in the housing and is operable to move the cam housing back and forth along the end of the skewer. A locking nut 116 adapted to fit on the skewer is disposed on the end of the skewer opposite the cam housing. The bicycle is connected to the rear wheel by placing the frame on the skewer adjacent each side of the wheel and between the cam housing and the locking nut. Thus, the cam housing is operable to clamp the bicycle frame to the wheel, between the cam housing and the locking nut. While one exemplary quick release skewer assembly has been described, there are many variations which are known in the art and within the scope of the invention.

Figure 8:
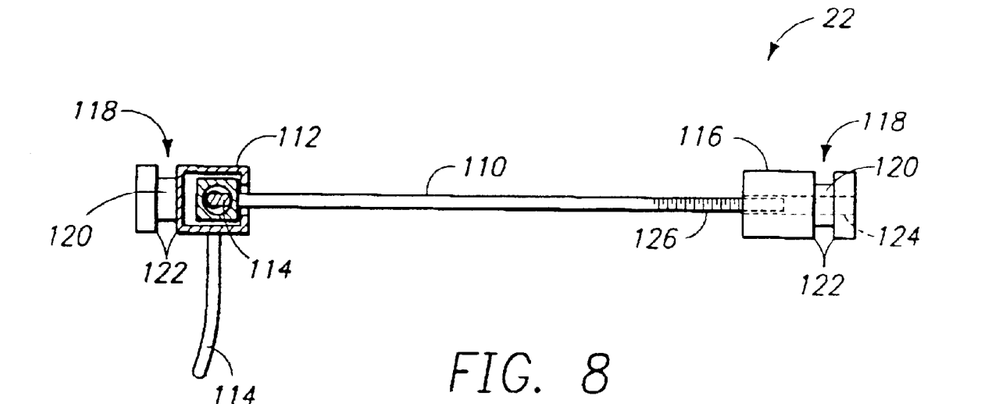
FIG. 8 is a front elevation of a skewer assembly according to the present invention, with the cam housing in partial cross-section to show the cam member operated to push the cam housing away from the locking nut. The locking member is shown disposed at the opposite end of the skewer.
Figure 9:
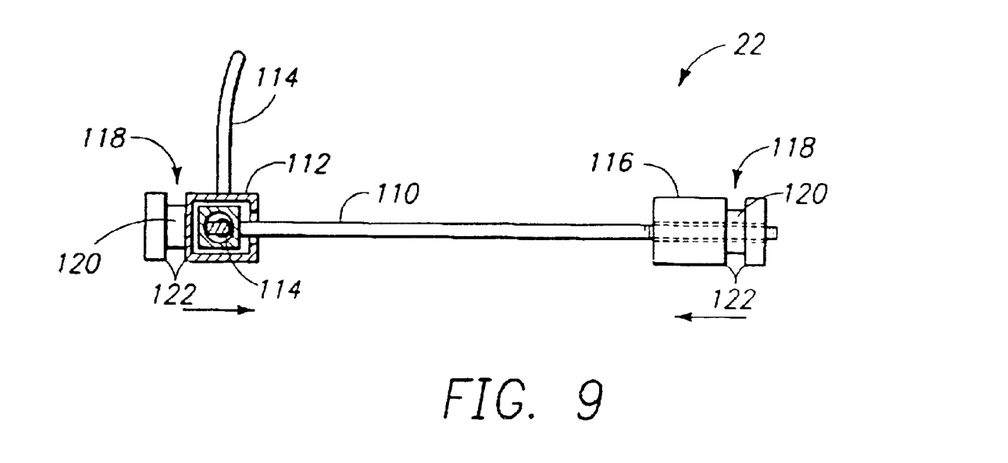
FIG. 9 is a front elevation of a skewer assembly according to the present invention, with the cam housing in partial cross-section to show the cam member operated to push the cam housing toward the locking nut. The opposite end of the skewer is shown extending completely through the locking member.

As best seen in FIGS. 8 and 9, cam housing 112 and locking nut 116 each includes an annular recess or channel 118 adapted to fit within, and engage receiver member 80 and bushing 86. The channel defines a bearing surface 120 between adjacent shoulder regions 122. Bearing surface 120 is adapted to bear the weight of the trailer, as well as the pulling load of the trailer. Shoulder regions 122 are adapted to retain the receiver member on the bearing surface, and prevent the receiver from being displaced laterally along the skewer assembly.

It will be appreciated by those of skill in the art, that forming the bearing surfaces directly on the cam housing and the locking nut provides many advantages over the prior skewer assemblies for trailers which place the bearing surfaces on separate components that are then mounted on the skewer. For example, the structure described and depicted in the exemplary embodiment is simpler to install, less expensive to manufacture, and less prone to failure.

As mentioned above, skewer assembly 22 may be configured for use with a variety of different bicycles having a variety of different wheel widths. This allows a manufacturer to make a single quick-release skewer assembly that can be used to adapt many different bikes for pulling trailer 12. As a result, a bike owner can purchase a quick-release skewer assembly for pulling a trailer without worrying whether the skewer assembly will fit his or her bike.

As shown in FIGS. 8 and 9, exemplary skewer assembly 22 has a locking nut 116 with a threaded central bore 124 that extends completely through the locking nut. The end of skewer 110 includes a threaded region 126 that is longer than locking nut 116 and is adapted to engage the central bore of the locking nut 116. Thus, the locking nut is selectively positionable either at the end of the skewer, as shown in FIG. 8, or between the opposing ends of the skewer such that the skewer extends completely through the locking nut, as shown in FIG. 9. Thus, locking nut 116 can be positioned along 116 so that the space between the locking nut and the cam housing corresponds to the width of the wheel hub and bike frame. In contrast, prior quick-release skewer assemblies for trailers which use a locking cap require the skewer to be shorted for bikes having relatively narrow wheel hubs.

As described above, apparatus 10 provides a safe and easy-to-use device for carrying a load behind a bicycle. Those of skill in the art will appreciate that the exemplary embodiments described may be modified in various ways within the scope of the invention as necessary or desired for a particular application.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. Apparatus for carrying a load behind a bicycle, the apparatus comprising:
    a carriage adapted to carry a load;
    at least one wheel rotatably connected to the carriage; and
    a hitch assembly coupled to the carriage and having at least one latch mechanism removably connectable to a bicycle, where the at least one latch mechanism includes
    a receiver member configured to receive and fit over a portion of the bicycle,
    a housing mounted to the hitch assembly,
    a locking member received in the housing and selectively movable between a closed position which prevents removal of the portion of the bicycle from the receiver member and an open position which enables removal of the portion of the bicycle from the receiver member, and
    a biasing element configured to bias the locking member toward the closed position.

2. The apparatus of claim 1, where the receiver member defines an opening adapted to receive the portion of the bicycle, and where the locking member blocks the opening of the receiver member when in the closed position.

3. The apparatus of claim 1, where the bicycle includes a rear-wheel skewer assembly, and where the receiver member is configured to receive and fit over a portion of the rear-wheel skewer assembly.

4. The apparatus of claim 3, where the receiver member is pivotally coupled to the skewer assembly.

5. The apparatus of claim 4, where the at least one latch mechanism includes a bushing configured to fit over the skewer assembly between the receiver member and the skewer assembly.

6. The apparatus of claim 3, where the skewer assembly includes opposing ends, and where the at least one latch mechanism includes two spaced-apart latch mechanisms, each configured to connect to the skewer assembly adjacent a different one of the opposing ends.

7. The apparatus of claim 1, where the biasing element is a spring.

8. The apparatus of claim 7, where the at least one latch mechanism includes a gripping member connected to the locking member, and where the gripping member protrudes from the housing to allow a user to slide the locking member between the closed and open positions.

9. The apparatus of claim 1, where the locking member is lockable in the open position.

10. The apparatus of claim 1, where the locking member is lockable in the closed position.

11. The apparatus of claim 1, where the hitch assembly includes a yoke pivotally coupled to the carriage, and where the yoke includes one or more shoulder members configured to engage a portion of the carriage and limit the pivot angle of the yoke relative to the carriage.

12. The apparatus of claim 1, where the carriage includes a plurality of arcuate frame members at least partially defining a load-carrying region, and one or more fairings extending between the frame members to at least partially enclose the load-carrying region.

13. The apparatus of claim 1, where the carriage includes a rear wall member that at least partially defines a load-carrying region, and where the rear wall member extends outward from the load-carrying region to form a fender covering a portion of the at least one wheel.

14. The apparatus of claim 1, where the carriage includes a frame and where the rear wall member includes a recessed portion adjacent the frame to provide clearance for a user's hand to grip the frame.

15. Apparatus for carrying a load behind a bicycle, where the bicycle includes a frame and at least one wheel having a central hub, the apparatus comprising:
    a load-supporting trailer removably connectable to the bicycle, and having a hitch assembly and at least one wheel; and
    a quick-release skewer assembly receivable in the wheel hub to connect the bicycle frame to the wheel, where the skewer assembly includes a skewer configured to extend through the wheel hub and engage a portion of the bicycle frame, a cam housing adapted to fit on the skewer, where the cam housing includes a channel, and a cam member received in the cam housing and operable to selectively clamp or release the bicycle frame and the wheel hub, where the cam housing channel defines a bearing surface configured to engage a portion of the hitch assembly when the trailer is connected to the bicycle.

16. The apparatus of claim 15, where the skewer assembly includes a locking nut adapted to fit on the skewer, and where the locking nut defines a bearing surface configured to engage a portion of the hitch assembly when the trailer is connected to the bicycle.

17. The apparatus of claim 16, where the locking nut includes a central bore sized to receive the skewer, and where the locking nut is selectively positionable along the skewer so that the skewer extends completely through the locking nut.

18. The apparatus of claim 15, where the cam housing defines shoulder regions adjacent each side of the bearing surface to retain the portion of the hitch assembly against the bearing surface.

19. The apparatus of claim 15, where the cam housing defines an annular channel adapted to engage a portion of the hitch assembly, and where the bearing surface is within the channel.

20. An adjustable-length, quick-release, trailer-receivable skewer assembly for use with various bicycles having wheel hubs of various widths, the skewer assembly comprising:

an elongate skewer having first and second ends and configured to extend through a bicycle wheel hub;

a locking nut fastenable to the skewer and selectively positionable either at the first end or between the first and second ends, where the locking nut includes a channel; and a quick-release mechanism disposed adjacent the second end and operable to clamp the wheel hub to a frame member of the bicycle;

where the locking nut channel defines a bearing surface configured to engage a portion of the trailer to connect to the bicycle.

21. The skewer assembly of claim 20, where the locking nut includes a threaded central bore, and where the first end of the skewer includes a threaded region adapted to engage the central bore, and where the threaded region on the first end is longer than the locking nut.

22. Apparatus for carrying a load behind a bicycle, the apparatus comprising:

a carriage adapted to carry a load;

at least one wheel rotatably connected to the carriage; and a hitch assembly coupled to the carriage and having at least one latch mechanism removably connectable to a bicycle, where the at least one latch mechanism includes a receiver member configured to receive and fit over a portion of the bicycle, a housing mounted to the hitch assembly, and a locking member received in the housing and selectively movable between a closed position which prevents removal of the portion of the bicycle from the receiver member and an open position which enables removal of the portion of the bicycle from the receiver member.

\* \* \* \* \*